March 30, 1948.　　　L. M. CROOK　　　2,438,541
CLAMP
Filed June 10, 1944
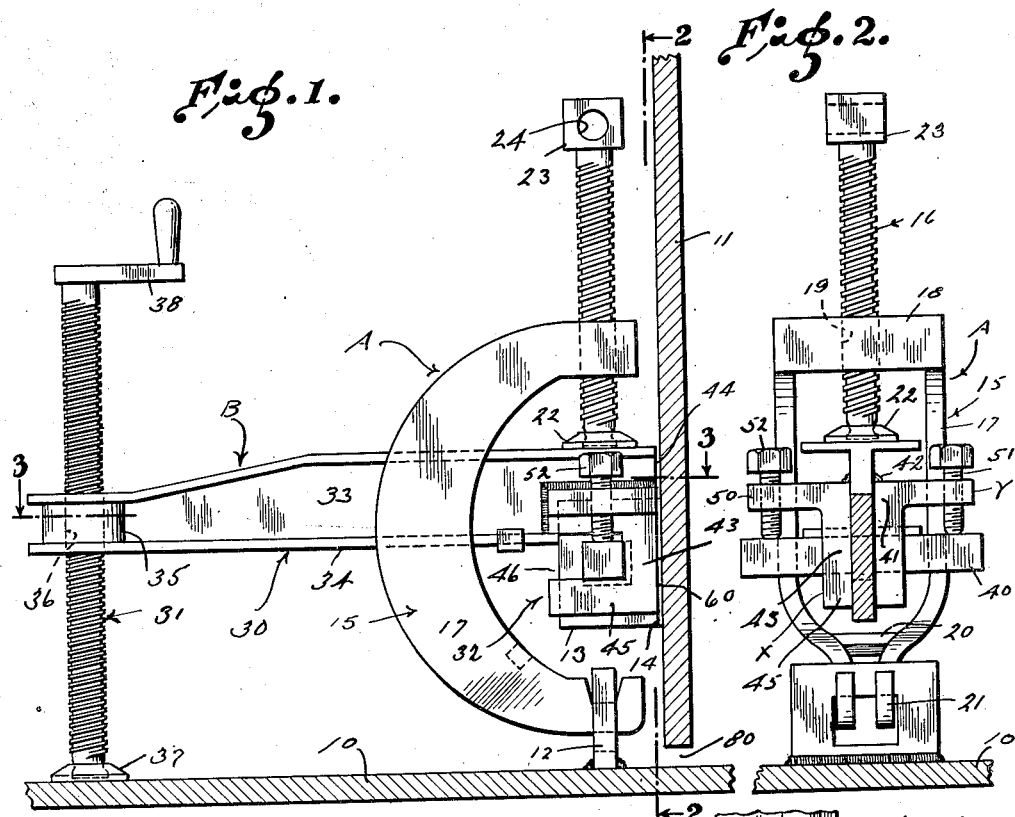
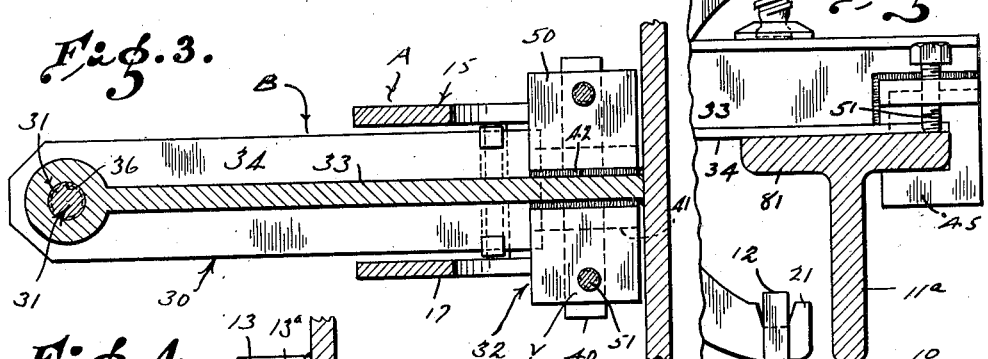
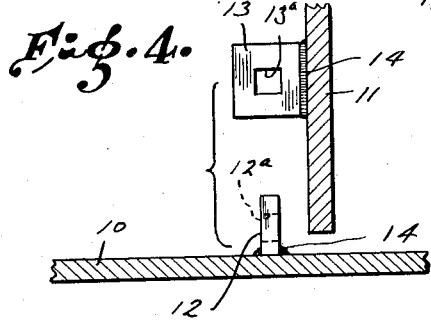
INVENTOR.
Lloyd M. Crook
BY
Attorney Patented Mar. 30, 1948

2,438,541

UNITED STATES PATENT OFFICE 2,438,541

CLAMP

Lloyd M. Crook, Long Beach, Calif.

Application June 10, 1944, Serial No. 539,669

7 Claims. (Cl. 29—284)

1

This invention has to do with a clamp and has particular reference to a clamp or clamp mechanism that can be used to advantage in handling structural members such as plates, beams, etc. It is a general object of the present invention to provide a clamp mechanism which is simple and inexpensive of construction and also of operation, and which can be used to quickly and accurately position structural members for welding or other like operations.

There are numerous situations where structural members are handled, for instance, where such members are fabricated into articles of manufacture or units such as ships or buildings. In the course of handling structural parts or members such as plates and beams it frequently occurs that parts designed or intended to abut for welding or other such operations do not join or are out of line. Situations such as I refer to make it necessary to spring or force the structural members into engagement for welding or the like, or to deflect them to bring them into the desired locations for welding.

A general object of my present invention is to provide a clamp mechanism for use in connection with structural members operable to effectively draw such members together or to deflect them or bring them into alignment, or both.

It is another object of my present invention to provide a clamp mechanism that effectively and practically combines a C-clamp and a lever arm, the C-clamp being operable to draw parts together, the lever arm being operable to deflect them, as circumstances may require.

The various objects and features of my invention will be fully understood from the following detailed description of a typical preferred form and application of my invention, throughout which description reference is made to the accompanying drawings, in which:

Fig. 1 is a side elevation of the mechanism of the present invention showing it in working position as applied to two structural plates arranged at right angles to each other and requiring the application of force to bring them together. Fig. 2 is a view taken as indicated by line 2—2 on Fig. 1. Fig. 3 is a plan section taken as indicated by line 3—3 on Fig. 1. Fig. 4 is a view of reduced size showing the structural members before the device of the present invention has been applied thereto and Fig. 5 is a view similar to a part of Fig. 1 showing the device of the present invention applied to a combination of structural members involving a plate and a beam.

2

The mechanism of the present invention is applicable, generally, to structural members, or the like, for shifting them relative to each other either to draw them together or to deflect one relative to the other in the general manner required in the course of handling or fabricating such members. In Figs. 1 to 4 of the drawings I show, for example, two structural members in the form of plates to be acted upon by the mechanism of the present invention. In the particular situation I show a horizontal plate 10 and a vertical plate 11. The vertical plate 11 is shown spaced slightly above the plate 10 so that force is required to bring the plates together or into a position where they can be joined by welding, or the like. This operation may involve lowering of the plate 11 or lifting of the plate 10, or both.

Where plain structural plates are involved, as is the case shown in Figs. 1 to 4 of the drawings, I apply tabs 12 and 13 to the plates 10 and 11, respectively, to facilitate joinder of the mechanism of my invention to the plates for otherwise there is no means of making connection with the plates. Each tab, as shown throughout the drawings, may involve a plain plate or body of metal having an opening or aperture for the reception of clamp parts and may be joined to its plate by welding 14. In the construction shown the tab 12 has an opening 12a for the reception of clamp parts while the tab 13 has an opening 13a for the reception of a clamp part. It will be understood that in practice the tabs may be made sufficiently heavy and rigid to withstand the pressures involved in the operations that I will describe and that they can be located at the proper points on the structural members and can be securely affixed to the members by welding, or the like, which can be cut away after the operation is complete.

The device of the present invention involves, generally, a C-clamp A and a lever clamp B. The clamps A and B are joined to the structural members 10 and 11 through the tabs 12 and 13 and cooperate so that they can be operated to shift the structural members relative to each other to draw them together or to deflect one relative to the other.

The C-clamp A has a C-shaped body 15 and a clamp screw 16. The body 15 is divided into spaced side sections 17 joined together at their upper or inner ends by a web 18 having a threaded opening 19 which carries the screw 16. At the lower or outer end of the body the side sections 17 turn in or toward each other and are joined by a web 20. The extreme end portions or tabs of the turned in portions of the side sections are shaped to form hooks 21 designed to engage a tab secured to a structural member or the like. In the particular case illustrated the hooks 21 of the C-clamp are designed and proportioned to engage the tab 12 by being hooked into the opening 12a of the tab 12.

The opening 19 is arranged in the web 18 so that it carries the screw 16 in a manner to face the hooks 21. The screw 16 is preferably a heavy clamp screw provided at its inner end with a bearing shoe 22 and at its outer end with a head 23 designed to be engaged by a suitable operating tool. In the case illustrated I have shown a head 23 with an opening 24 for the reception of a bar, or the like.

The mechanism that I have thus far described is similar generally to an ordinary C-clamp except for the hooked end and that the C-shaped body is formed of the spaced side sections 17 joined by the webs 18 and 20. The body structure, however, is a rigid unit.

The lever clamp B involves, generally, a lever arm 30, a clamp screw 31 at the outer end of the lever arm and fastening means 32 at the inner end of the lever arm designed for making connection with a tab on a structural member, such as the tab 13 on member 11.

The lever arm 30 is an elongate member preferably in the form of a beam having a vertical web 33 and top and bottom flanges 34. This construction makes for a light yet rigid arm. At its outer end the arm 30 is provided with a boss-like part 35 with a threaded opening 36 for reception of the screw 31.

The screw 31 is preferably a heavy or coarsely threaded clamp screw provided at one end with a bearing shoe or foot 37 and at its other end with suitable operating means. In the case illustrated I have shown a hand lever 38 on the screw to facilitate operation thereof.

The fastening means 32 involves, generally, a pair of hooks X on the inner end of the arm 30 and clamps Y on the arm at the hooks and clamping a connecting bar 40, or the like, in the hooks. The hooks are at opposite sides of the inner end portion of the arm 30 where the lowering flange 34 of the arm has been removed. Each hook involves a base portion 41 secured to the side of the arm as by welding 42, a depending shank portion 43 flush with the inner end 44 of the arm and a head 45 on the end of the shank projecting inwardly. The structure just described forms a hook opening or mouth 46 adapted to freely receive the cross bar 40. The clamps Y involve ears 50 projecting outwardly from the base portions 41 of the hooks and clamp screws 51 carried by the ears to be operated downwardly into pressure engagement with a cross bar 40 carried in the hooks. Each screw 51 has a head 52 for the reception of a wrench or the like.

The cross bar 40 is designed to be inserted through the opening 13a in the tab 13 to project from either side of the tab. The tab 13 is adapted to be inserted between the hooks X, the arm having been cut away or recesses between the hooks for the reception of the tab. In practice I may proportion the cross bar 40 and the opening 13a so that they fit rather closely or I may proportion the parts so that when the cross bar 40 is in the opening 13a or tab 13 and the hooks X are applied to the cross bar, as shown throughout the drawings, the outer ends 60 of the hooks and the end 44 of the arm are in position to bear against the face of plate 11.

In using the clamp mechanism of the present invention the clamp arm B is applied to the plate 11 through the mechanism just described, that is, the bar 40 is arranged through the opening in tab 13 on plate 11 and the hooks X on the arm 30 are applied to the cross bar. The clamp screws 51 are made tight on the cross bar so that the arm 30 is rigidly connected to the cross bar. As above stated, in the preferred arrangement the hooks X and the end of the arm 30 bear against or are close to the face of the plate 11 when the arm is applied to the tab on the plate, as just described. The C-clamp A is applied to the tab 12 on plate 10 and the two sections 17 of its body pass the arm 30 so that the clamp screw 16 of the C-clamp A is in position to bear down on the inner end portion of the arm 30 opposite or above the means 32 by which the arm 30 is connected to the plate 11.

If it is desired to merely draw the plates 10 and 11 together to close a gap such as indicated at 80 the screw 16 is operated to bear down on the top of the inner end portion of the arm 30 and the screw 31 is operated so that the arm is allowed to bodily move down or toward the plate 10, as the gap 80 is closed. Should it be desired to deflect the plate 11 relative to the plate 10 or to vary the angular relationship between the plates as they are drawn together, the screw 31 can be operated to bring about this result. For instance, if it is desired that the edge of the plate 11 adjacent the plate 10 be deflected in toward the tab 12, then the screw 31 can be operated to lift the outer end of the arm 30 or the screw 31 can be left without being operated as the plates are drawn together. If it is desired to deflect the plate 11 in the opposite direction or outward away from the tab 12 then the screw 31 can be operated to allow lowering of the outer end of the arm 30 as the plates are drawn together by the screw 16.

In the form of the invention shown in Fig. 5 I show the device applied to a structural member 11a in the form of a beam rather than a plain plate as shown in Fig. 1. In this case I do not need to apply a tab to the beam nor do I need to employ a cross bar 40, as above described, but I can apply the hooks X directly to a flange 81 of the beam and can arrange the lever clamp B so that it rests on the top of the flanges 81 of the beam. This application of the mechanism will serve to illustrate the manner in which it can be applied to various situations such as are encountered in the course of handling structural parts.

From the foregoing description it will be apparent that I have provided a relatively simple inexpensive clamp mechanism by which structural members can be handled easily and quickly to bring them into the desired positions and to hold them in such positions while other operations are performed, for instance, while they are being welded together or otherwise connected. It is to be noted that the two clamps A and B cooperate by fitting one within the other and can be operated either individually or simultaneously as circumstances require. When the clamps are used together the desired movements of the structural members can be attained by proper relative rotation or operation of the screws 16 and 31.

Having described only a typical preferred form and application of my invention, I do not wish to be limited or restricted to the specific details herein set forth, but wish to reserve to myself any variations or modifications that may appear to Having described my invention, I claim:

1. In combination, a C-clamp and a lever clamp, the C-clamp having a C-shaped body with spaced sections passing the lever clamp, having a hook at one end and having a clamp screw at the other end opposing the hook, the lever clamp having an inner end portion extending between the spaced sections and engaged by the screw and having a lever arm projecting from the C-clamp.

2. In combination, a C-clamp and a lever clamp, the C-clamp having a C-shaped body with spaced sections passing the lever clamp, one end of the body being hook shaped and the other end of the body carrying a clamp screw, the lever clamp having an inner end portion extending between the spaced sections, engaged by the screw and having means at its inner end portion for making connection with work and having a projecting arm carrying a jack screw.

3. In combination, a C-clamp and a lever clamp, the C-clamp including a C-shaped body with spaced sections passing the lever clamp and a clamp screw carried by one end of the body and facing the other end of the body, the lever clamp having a hook shaped inner end portion extending between the spaced sections and directly engaged by the screw.

4. In combination, a C-clamp and a lever clamp, the C-clamp having a C-shaped body with spaced side sections and having a clamp screw carried by one end of the body and facing the other end of the body, the said other end of the body being hook shaped, the lever clamp including an arm with an outer end projecting from the C-clamp and having an inner end entered between the side sections and engaged by the said clamp screw and a clamp screw carried by the outer end of the arm.

5. In combination, a C-clamp and a lever clamp, the C-clamp having a C-shaped body with spaced side sections and having a clamp screw carried by one end of the body and a work engaging hook at the other end of the body opposite the screw, the lever clamp including an arm with a work engaging inner end entered between the side sections and directly engaged by the said clamp screw and a clamp screw at the other end of the arm remote from the C-clamp.

6. In combination, a C-clamp and a lever clamp, the C-clamp having a C-shaped body with spaced side sections and having a clamp screw carried by one end of the body facing the other end of the body, the lever clamp including an arm with its inner end entered between the side sections to be engaged by the said clamp screw, work engaging means at the inner end of the arm, and a clamp screw at the outer end of the arm, the two clamp screws being substantially parallel.

7. In combination, a C-clamp and a lever clamp, the C-clamp having a C-shaped body with spaced side sections and having a clamp screw carried by one end of the body facing the other end of the body, the lever clamp including an arm with its inner end entered between the side sections to be engaged by the said clamp screw, work engaging means at the inner end of the arm, and a clamp screw at the outer end of the arm remote from the C-clamp, the work engaging means including a hook at each side of the arm and a clamp screw at each hook for securing a work member in the hooks.

LLOYD M. CROOK.

REFERENCES CITED

The following references are of record in the file of this patent:

UNITED STATES PATENTS

| Number | Name | Date |
|---|---|---|
| 378,299 | Finch | Feb. 21, 1888 |
| 501,177 | Wulff | July 11, 1893 |
| 645,665 | Hartford | Mar. 20, 1900 |
| 793,412 | Bliss | June 27, 1905 |
| 809,882 | Wrigley | Jan. 9, 1906 |
| 884,772 | Sorensen | Apr. 14, 1908 |
| 1,045,996 | McLean | Dec. 3, 1912 |
| 1,065,016 | Anderson | June 17, 1913 |
| 1,377,207 | Lee | May 10, 1921 |
| 1,952,453 | Mueller | Mar. 27, 1934 |
| 1,954,599 | Rippen | Apr. 10, 1934 |
| 2,275,894 | Ferguson | Mar. 10, 1942 |